US007799437B2

(12) United States Patent
Chan et al.

(10) Patent No.: US 7,799,437 B2
(45) Date of Patent: Sep. 21, 2010

(54) MAGNESIUM-BASED COMPOSITE MATERIAL AND METHOD FOR MAKING THE SAME

(75) Inventors: Kam-Shau Chan, Taipei Hsien (TW); Cheng-Shi Chen, Taipei Hsien (TW); Guang-Liang Sheu, Taipei Hsien (TW); Qing-Chun Du, Shenzhen (CN); Wen-Zhen Li, Beijing (CN); Kai-Li Jiang, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 188 days.

(21) Appl. No.: 12/109,220

(22) Filed: Apr. 24, 2008

(65) Prior Publication Data

US 2009/0081408 A1    Mar. 26, 2009

(30) Foreign Application Priority Data

Sep. 21, 2007 (CN) .................. 2007 1 0077343

(51) Int. Cl.
*B32B 15/14* (2006.01)
*B32B 15/16* (2006.01)
*C22C 101/10* (2006.01)
*C22C 1/10* (2006.01)

(52) U.S. Cl. .................. 428/634; 428/109; 428/143; 106/286.2

(58) Field of Classification Search .................. None
See application file for complete search history.

(56) References Cited

U.S. PATENT DOCUMENTS

| 3,888,661 A | * | 6/1975 | Levitt et al. .................. 419/6 |
| 4,223,075 A | * | 9/1980 | Harrigan et al. .............. 428/610 |
| 4,731,298 A | * | 3/1988 | Shindo et al. ............... 428/611 |
| 2004/0053780 A1 | * | 3/2004 | Jiang et al. .................. 502/182 |
| 2007/0036978 A1 | * | 2/2007 | Chen ........................ 428/408 |
| 2009/0061211 A1 | * | 3/2009 | Chan et al. .................. 428/329 |

FOREIGN PATENT DOCUMENTS

| JP | 58107435 A | * | 6/1983 |
| JP | 2007016286 A | * | 1/2007 |
| JP | 2007291432 A | * | 11/2007 |

* cited by examiner

*Primary Examiner*—Aaron Austin
(74) *Attorney, Agent, or Firm*—Andrew C. Cheng

(57) ABSTRACT

The present invention relates to a magnesium-based composite material includes a magnesium-based metallic material, and at least one nanoscale reinforcement film disposed therein. The present invention also relates to a method for fabricating the above-described a magnesium-based composite material, the method includes the steps of: (a) providing at least two magnesium-based plates; (b) providing at least one nanoscale reinforcement film; (c) sandwiching the at least one nanoscale reinforcement film between the at least two magnesium-based plates to form a preform; and (d) hot rolling the preform to achieve the magnesium-based composite material.

13 Claims, 5 Drawing Sheets

MAGNESIUM-BASED COMPOSITE MATERIAL AND METHOD FOR MAKING THE SAME

RELATED APPLICATIONS

This application is related to commonly-assigned application entitled, "MAGNESIUM-BASED COMPOSITE MATERIAL AND METHOD FOR MAKING THE SAME", Ser. No. 12/109,226, filed Apr. 24, 2008. Disclosure of the above-identified application is incorporated herein by reference.

BACKGROUND

1. Field of the Invention

The present invention relates to composite materials and methods for fabricating the same and, particularly, to a magnesium-based composite material and a method for fabricating the same.

2. Discussion of Related Art

Nowadays, various alloys have been developed for special applications. Among these alloys, magnesium alloys have relatively superior mechanical properties, such as low density, good wear resistance, and high elastic modulus. Generally, two kinds of magnesium alloys have been developed: casting magnesium alloy and wrought magnesium alloy. In wrought magnesium alloy, by using an extrusion process, most of the casting defects can be eliminated and the metal grains can be refined. However, the toughness and the strength of the magnesium alloys are not able to meet the increasing needs of the automotive and aerospace industry for tougher and stronger alloys.

To address the above-described problems, magnesium-based composite materials have been developed. In the magnesium-based composite material, nanoscale reinforcements are mixed with the magnesium metal or alloy. The most common methods for making the magnesium-based composite material are through powder metallurgy and stir casting. However, in powder metallurgy, the metal or alloy is easily oxidized because the metal or alloy is in the form of a fine powder. In particular, the magnesium powder may spontaneously combust due to oxidization. In stir casting, the nanoscale reinforcements are added to melted metal or alloy and are prone to aggregate. As such, the nanoscale reinforcements can't be well dispersed. Further, the above-mentioned methods generally include complex processes using high cost manufacturing equipment.

What is needed, therefore, is to provide a magnesium-based composite material and a method for fabricating the same, in which the above problems are eliminated or at least alleviated.

SUMMARY

In one embodiment, a magnesium-based composite material includes a magnesium-based metallic material, and at least one nanoscale reinforcement film disposed therein.

In another embodiment, a method for fabricating the above-described magnesium-based composite material, the method includes the steps of: (a) providing at least two magnesium-based plates; (b) providing at least one nanoscale reinforcement film; (c) sandwiching the at least one nanoscale reinforcement film between the at least two magnesium-based plates to form a preform; and (d) hot rolling the preform to achieve the magnesium-based composite material.

Other advantages and novel features of the present magnesium-based composite material and the related method for fabricating the same will become more apparent from the following detailed description of preferred embodiments when taken in conjunction with the accompanying drawings.

BRIEF DESCRIPTION OF THE DRAWINGS

Many aspects of the present magnesium-based composite material and the related method for fabricating the same can be better understood with reference to the following drawings. The components in the drawings are not necessarily to scale, the emphasis instead being placed upon clearly illustrating the principles of the present magnesium-based composite material and the related method for fabricating the same.

Figure 1:
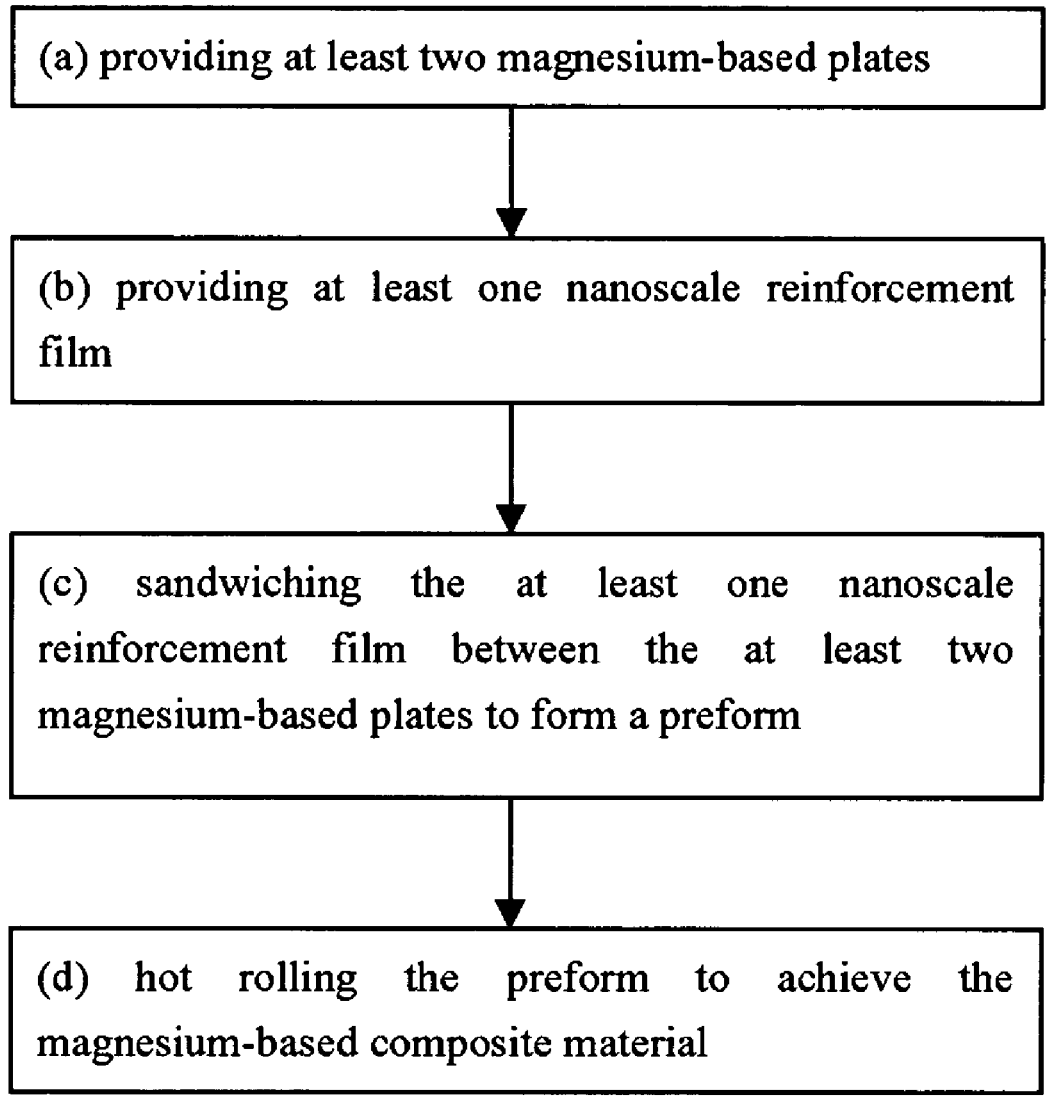
FIG. 1 is a flow chart of a method for fabricating a magnesium-based composite material, in accordance with a present embodiment.

Corresponding reference characters indicate corresponding parts throughout the several views. The exemplifications set out herein illustrate at least one preferred embodiment of the present magnesium-based composite material and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present magnesium-based composite material and the related method for fabricating the same.

Referring to FIG. 1, a method for fabricating a magnesium-based composite material includes the steps of: (a) providing at least two magnesium-based plates; (b) providing at least one nanoscale reinforcement film; (c) sandwiching the at least one nanoscale reinforcement film between the at least two magnesium-based plates to form a preform; and (d) hot rolling the preform to achieve the magnesium-based composite material.

In step (a), the material of the magnesium-based plates can, beneficially, be pure magnesium or magnesium-based alloys. The components of the magnesium-based alloys include magnesium and other elements selected from a group consisting of zinc (Zn), manganese (Mn), aluminum (Al), thorium (Th), lithium (Li), silver, calcium (Ca), and any combination thereof. A weight ratio of the magnesium to the other elements can advantageously, be more than about 4:1. The components of the at least two magnesium-based plates can be the same or different. A thickness of the magnesium-based plates can, beneficially, be in the approximate range from 0.1 millimeter to 1 millimeter. Quite suitably, the thickness of the magnesium-based plates is about 0.3 millimeter.

Quite usefully, an additional step (e) of treating the magnesium-based plates by forming a transition film on a surface of the magnesium-based plates can, advantageously, be further provided after step (a). In step (e), the transition film can, opportunely, be a nickel film or a nickel-based alloy film. The components of the nickel-based alloy include nickel and other elements selected from a group consisting of magnesium (Mg), zinc (Zn), aluminum (Al), and any combination thereof. The transition film can, suitably, be formed on the surface of the magnesium-based plates by any known method (e.g. vacuum evaporation, sputtering, or deposition). The transition film can enhance the combination ability between the nanoscale reinforcement film and the magnesium-based plates.

In step (b), the nanoscale reinforcement film includes a plurality of nanoscale reinforcement, and can, suitably, be a carbon nanotube film or a carbon nanofiber film. The mass percentage of the nanoscale reinforcement film in the magnesium-based composite material is in the approximate range from 0.5% to 2%. Quite usefully, the weight percentage of the nanoscale reinforcement film is 1%.

In the present embodiment, the nanoscale reinforcement film is the carbon nanotube film, and can, beneficially, be provided by being pulled from a super-aligned array of carbon nanotubes by the substeps of: (b1) providing a super-aligned array of carbon nanotubes; (b2) selecting a plurality of carbon nanotube segments having a predetermined width from the array of carbon nanotubes; (b3) pulling the carbon nanotube segments at an even/uniform speed to form the carbon nanotube film.

In step (b1), the super-aligned array of carbon nanotubes can be formed by the substeps of: (b11) providing a substantially flat and smooth substrate; (b12) forming a catalyst layer on the substrate; (b13) annealing the substrate with the catalyst at the approximate range of 700° C. to 900° C. in air for about 30 to 90 minutes; (b14) heating the substrate with the catalyst up to 500° C. to 740° C. in a furnace with a protective gas therein; and (b15) supplying a carbon source gas into the furnace for about 5 to 30 minutes and growing a super-aligned array of carbon nanotubes from the substrate.

In step (b11), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (b12), the catalyst can, advantageously, be made of iron (Fe), cobalt (Co), nickel (Ni), or any alloy thereof.

In step (b14), the protective gas can, beneficially, be made up of at least one of nitrogen ($N_2$), ammonia ($NH_3$), and a noble gas. In step (b15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed closely together by van der Waals attractive force.

In step (b2), quite usefully, the carbon nanotube segments having a predetermined width can be selected by using a tool (e.g., adhesive tape or another tool allowing multiple carbon nanotubes to be gripped and pulled simultaneously). In step (b3), the pulling direction is substantially perpendicular to the growing direction of the super-aligned array of carbon nanotubes.

More specifically, during the pulling step, as the initial carbon nanotube segments are drawn out, other carbon nanotube segments are also drawn out end to end, due to the van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner is able to have a selectable, predetermined width.

The width of the carbon nanotube film depends on the size of the carbon nanotube array. The length of the carbon nanotube film is arbitrary. In one useful embodiment, when the size of the substrate is 4 inches, the width of the carbon nanotube film is in the approximate range of 1 centimeter to 10 centimeters, and the thickness of the carbon nanotube film is in the approximate range of 0.01 to 100 microns.

It is to be understood that the method for providing the nanoscale reinforcement film is not restricted by the above-mentioned steps, but any method (e.g. a spraying method, or a filtration method) known in the art.

In step (c), the nanoscale reinforcement film can, beneficially, be sandwiched by the at least two magnesium-based plates by disposing the nanoscale reinforcement film between the two magnesium-based plates. It is noted that because the carbon nanotubes in the super-aligned array in step (a) have a high purity and a high specific surface area, the carbon nanotube film is adhesive. As such, in step (c), the nanoscale reinforcement film adheres to one of the magnesium-based plates directly.

It is to be understood that, in step (c), a plurality of nanoscale reinforcement films will adhere to the magnesium-based plate and overlapped with each other. The aligned angles and the number of the films are arbitrary but can be set depending on the actual needs/use. The nanoscale reinforcement films are combined (i.e., attached to one another) by van de Waals attractive force to form a stable multi-layer film. When the width of the magnesium-based plate is wider than the width of the nanoscale reinforcement film, a plurality of nanoscale reinforcement films will be adhered to the magnesium-based plate side by side.

Figure 2:
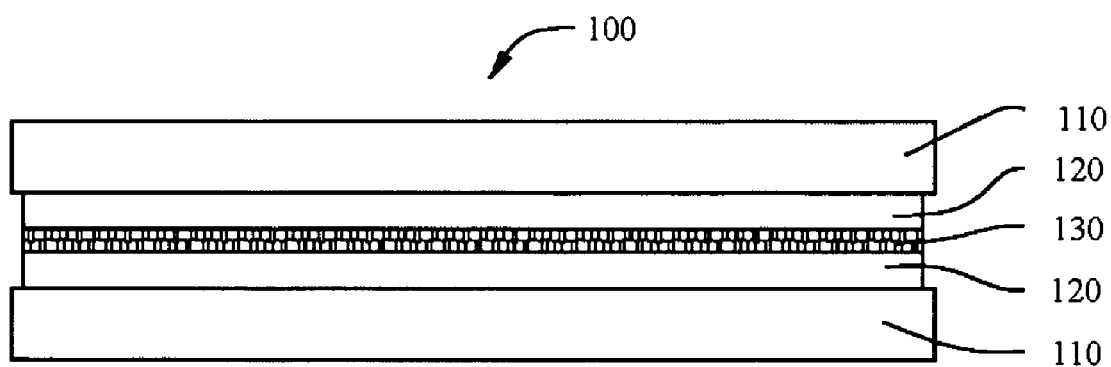
FIG. 2 is a schematic view of a preform of the magnesium-based composite material of FIG. 1.

Referring to FIG. 2, a preform 100 formed in step (c), in the present embodiment, includes two magnesium-based plates 110, two transition layers 120, and a nanoscale reinforcement film 130. The two transition layers 120 are respectively formed on a surface of the two magnesium-based plates 110. The nanoscale reinforcement film 130 is sandwiched by the two magnesium-based plates 110. The two transition layers 120 faces each other. It will be apparent to those having ordinary skill in the field of the present invention that the number of the magnesium-based plates and the nanoscale reinforcement films is arbitrary or set depending on actual needs/use. The nanoscale reinforcement films are sandwiched by the magnesium-based plates.

Figure 3:
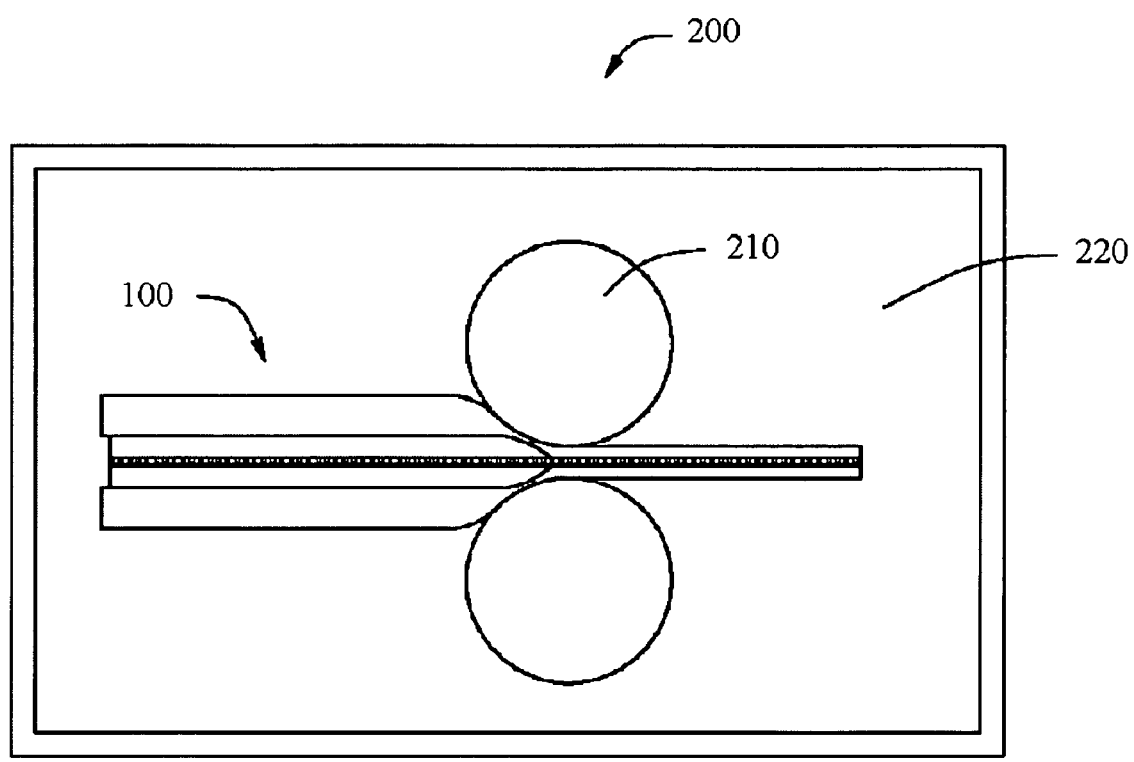
FIG. 3 is a schematic view of a hot-rolling step of the method of FIG. 1.

Referring to FIG. 3, a hot-rolling mill 200 includes a container 220, and two rollers 210 disposed in the container 220. The rollers 210 and the air in the container 220 are heated to a predetermined temperature. In step (d), the preform 100 can, advantageously, be hot rolled by the hot-rolling mill 200 by the substeps of: (d1) preheating the preform 100 and the rollers 210 to a predetermined temperature in the container 220; (d2) hot rolling the preform 100 to achieve the magnesium-based composite material.

In step (d1), the temperature can, opportunely, be in the approximate range from 300° C. to 400° C. The preheating step can enhance the combination ability of the magnesium-based plates. In step (d2), a pressure is applied on the preform at an elevated temperature by the rollers 210. As such, the magnesium-based material infiltrates into the interspaces between the nanoscale reinforcements to form a composite material.

Quite suitably, an additional step (f) of annealing the magnesium-based composite material can, advantageously, be further provided after step (d). In step (f), the magnesium-based composite material can be annealed in vacuum or in a protective gas. The protective gas can, beneficially, be nitrogen ($N_2$) and/or a noble gas. The annealing temperature is in the approximate range from 180° C. to 320° C. The annealing time is about 2 to 3 hours. The annealing step can eliminate defects in the magnesium-based composite material caused by stress in step (d).

It is to be understood that, the nanoscale reinforcement film is uniformly and self-sustainable. As such, the achieved magnesium-based composite material includes a plurality of reinforcement uniformly dispersed therein. Further, the method is simple and can be easily used in mass production.

Figure 4:
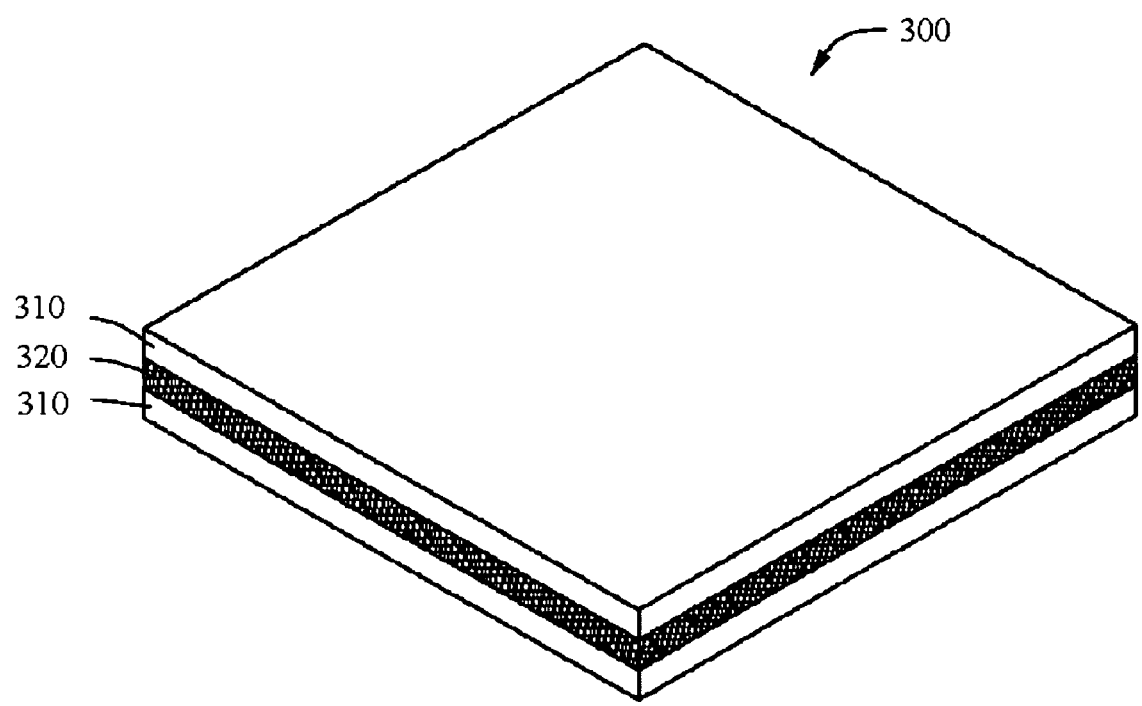
FIG. 4 is a schematic view of a magnesium-based composite material, in accordance with a first embodiment.

Referring to FIG. 4, the magnesium-based composite material 300 in the first embodiment includes two magnesium-based metallic layers 310, and one magnesium-based composite layer 320. The magnesium-based composite layer 320 is sandwiched by the two magnesium-based metallic layers 310 with a plurality of nanoscale reinforcements uniformly dispersed therein. The thickness of the magnesium-based metallic layer 310 is in the approximate range from 0.2 to 0.4 millimeter. The thickness of the magnesium-based composite layer 320 is in the approximate range from 1 nanometer to 100 nanometers. In the magnesium-based composite layer 320, magnesium-based metallic material is filled in the interspaces between the nanoscale reinforcements, and thereby, forms a composite layer. The nanoscale reinforcements are uniformly dispersed in the magnesium-based composite material. Therefore, the toughness and the strength of the magnesium-based composite material can be enhanced.

Figure 5:
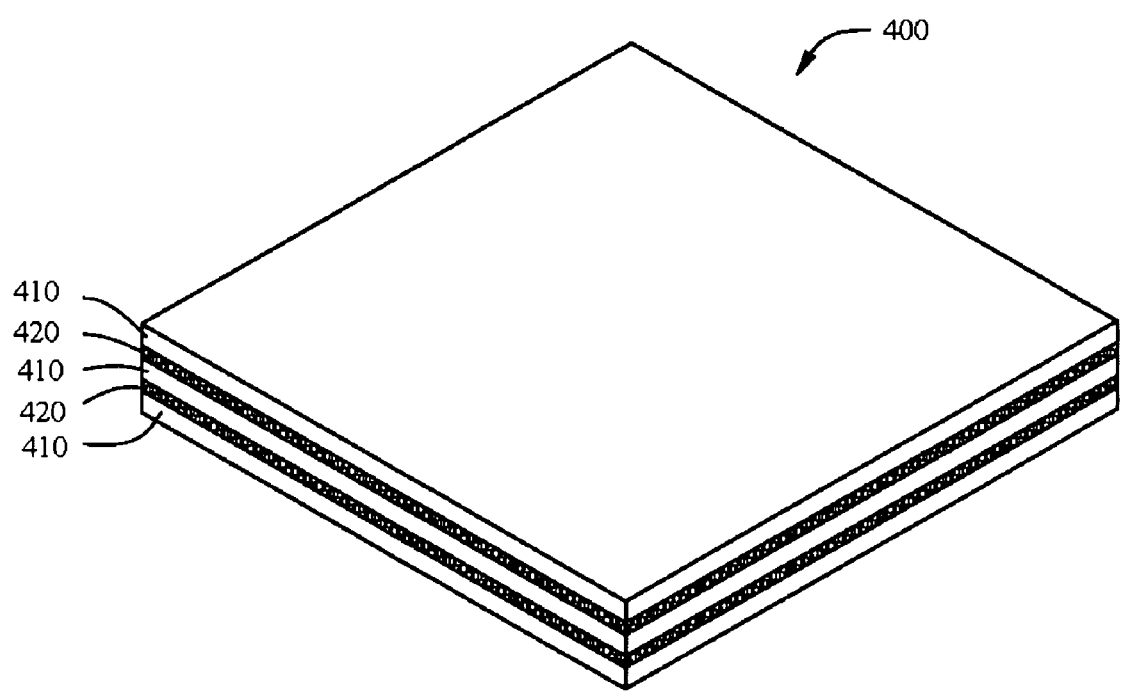
FIG. 5 is a schematic view of a magnesium-based composite material, in accordance with a second embodiment.

Referring to FIG. 5, the magnesium-based composite material 400 in the second embodiment is similar to the magnesium-based composite material 300 in the first embodiment, and includes five magnesium-based metallic layers 410, and two magnesium-based composite layers 420. The two magnesium-based composite layers 420 are respectively sandwiched by the five magnesium-based metallic layers 410.

It will be apparent to those having ordinary skill in the field of the present invention that the number of the magnesium-based metallic layers, and the magnesium-based composite layers is arbitrary or depended on actual needs/use. The magnesium-based composite layers are sandwiched by the magnesium-based metallic layers. As the number of the magnesium-based composite layers increased, the strength and toughness of the magnesium-based composite material can be enhanced.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A magnesium-based composite material comprising:
at least two magnesium-based metallic layers, at least one magnesium-based composite layer sandwiched by the at least two magnesium-based metallic layers, and a transition layer located between the at least one magnesium-based composite layer and one of the at least two magnesium-based metallic layers, wherein the at least one magnesium-base composite layer comprises a nanoscale reinforcement film, and the transition layer comprises a material selected from the group consisting of nickel or nickel-based alloy.

2. The magnesium-based composite material as claimed in claim 1, wherein the nanoscale reinforcement film is a single-layer film or a multi-layer film.

3. The magnesium-based composite material as claimed in claim 2, wherein the nanoscale reinforcement film comprises a plurality of nanoscale reinforcements, the nanoscale reinforcements are aligned in a same direction.

4. The magnesium-based composite material as claimed in claim 1, wherein the nanoscale reinforcement film is self-sustainable.

5. The magnesium-based composite material as claimed in claim 1, wherein the nanoscale reinforcement film is a carbon nanotube film or a carbon nanofiber film.

6. The magnesium-based composite material as claimed in claim 1, wherein a weight percentage of the nanoscale reinforcement film in the magnesium-based composite material is in the approximate range from 0.5% to 2%.

7. The magnesium-based composite material as claimed in claim 1, wherein a material of the at least two magnesium-based metallic layers is magnesium alloy.

8. The magnesium-based composite material as claimed in claim 7, wherein the components of the magnesium-based alloy comprises magnesium and other elements selected from the group consisting of zinc, manganese, aluminum, thorium, lithium, silver, calcium, and any combination thereof.

9. The magnesium-based composite material as claimed in claim 8, wherein a weight ratio of the magnesium to the other elements is above about 4:1.

10. The magnesium-based composite material as claimed in claim 1, wherein a material of the at least two magnesium-based metallic layers is pure magnesium.

11. The magnesium-based composite material as claimed in claim 1, wherein the nanoscale reinforcement film comprises at least one carbon nanotube film, the at least one carbon nanotube film comprises carbon nanotube segments joined end to end due to van der Waals attractive force between ends of the adjacent carbon nanotube segments.

12. The magnesium-based composite material as claimed in claim 11, wherein the at least one carbon nanotube film is pulled out from an array of carbon nanotubes.

13. The magnesium-based composite material as claimed in claim 12, wherein carbon nanotubes of the at least one carbon nanotube film are substantially parallel to a pulling direction of the at least one carbon nanotube film.

* * * * *